(12) United States Patent
Oki et al.

(10) Patent No.: US 7,021,714 B2
(45) Date of Patent: Apr. 4, 2006

(54) RECLINER ADJUSTER FOR A SEAT

(75) Inventors: Yasukazu Oki, Hiroshima (JP);
Kiyonori Umezaki, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 10/740,420

(22) Filed: Dec. 22, 2003

(65) Prior Publication Data

US 2004/0150256 A1 Aug. 5, 2004

(30) Foreign Application Priority Data

Dec. 26, 2002 (JP) .............................. 2002-377161

(51) Int. Cl.
*A47C 1/025* (2006.01)
(52) U.S. Cl. ..................................... 297/366; 297/367
(58) Field of Classification Search ................ 297/366, 297/367
See application file for complete search history.

(56) References Cited

U.S. PATENT DOCUMENTS

| | | | | |
|---|---|---|---|---|
| 6,023,994 | A * | 2/2000 | Yoshida ........................ | 74/530 |
| 6,092,874 | A * | 7/2000 | Kojima et al. ............... | 297/367 |
| 6,102,480 | A * | 8/2000 | Asano ......................... | 297/367 |
| 6,142,569 | A * | 11/2000 | Kidokoro et al. ........... | 297/366 |
| 6,328,383 | B1 * | 12/2001 | Rohee et al. ................ | 297/367 |
| 6,634,713 | B1 * | 10/2003 | Nonomiya et al. .......... | 297/367 |
| 6,641,217 | B1 * | 11/2003 | Yamada et al. .............. | 297/367 |
| 6,669,297 | B1 * | 12/2003 | Cilliere et al. ............... | 297/367 |
| 2002/0043855 | A1 | 4/2002 | Lange | |
| 2002/0096923 | A1 * | 7/2002 | Uramichi ..................... | 297/366 |
| 2002/0175548 | A1 * | 11/2002 | Asano et al. ................ | 297/367 |
| 2003/0025376 | A1 * | 2/2003 | Moriyama et al. .......... | 297/367 |

FOREIGN PATENT DOCUMENTS

| | | |
|---|---|---|
| EP | 0 773 133 | 5/1997 |
| EP | 1 225 086 | 7/2002 |
| JP | 2000-342370 | 12/2000 |

* cited by examiner

*Primary Examiner*—Peter M. Cuomo
*Assistant Examiner*—Stephen D'Adamo
(74) *Attorney, Agent, or Firm*—Wenderoth, Lind & Ponack, L.L.P.

(57) ABSTRACT

A recliner adjuster for adjusting an inclination of a seat back with respect to a seat cushion includes a cam rotatably mounted between first and second brackets that are respectively fixed to the seat cushion and the seat back, and a lock plate interposed between the first and second brackets so as to move radially outwardly or inwardly with rotation of the cam. The lock plate has an engaging portion having teeth formed on an outer edge thereof, and respective side edges. The lock plate also has first and second shoulder portions formed on respective sides of the engaging portion. The first bracket has first and second guide members that define a guide groove therebetween in which the engaging portion of the lock plate is slidably received. The second bracket has internal teeth that are brought into engagement with the teeth of the engaging portion of the lock plate when the lock plate moves radially outwardly. When a load applied to a seat back is less than a predetermined value, contact between one of the side edges of the engaging portion and an end face of one of the first and second guide members withstands the load. When a load applied to the seat back is greater than the predetermined value, the aforementioned contact and contact between one of the first and second shoulder portions and a portion of the other of the first and second guide members withstand this load.

4 Claims, 7 Drawing Sheets

FRONT ←→ REAR

FRONT ⟵⟶ REAR

RECLINER ADJUSTER FOR A SEAT

BACKGROUND OF THE INVENTION

1. Field of the Invention

The present invention relates to a recliner adjuster attached to, for example, an automobile seat for appropriately adjusting inclination of a seat back with respect to a seat cushion.

2. Description of the Related Art

Conventional reclining seats are provided with a recliner adjuster interposed between a seat cushion and a seat back hingedly connected to the seat cushion. The recliner adjuster includes a first bracket fixed to one of the seat cushion and the seat back, and a second bracket fixed to the other of the seat cushion and the seat back and mounted on the first bracket so that one of the first and second brackets can rotate relative to the other.

The recliner adjuster also includes a cam interposed between the first and second brackets and fixed to a support shaft that is concentrically aligned with a center of rotation of the one of the first and second brackets relative to the other. Rotation of the support shaft rotates the cam, which in turn causes a lock plate to slide radially outwardly or inwardly between the first and second brackets. The first bracket has a radially extending guide groove having opposite parallel side walls. The lock plate has teeth formed on an outer periphery thereof and is slidably disposed within the guide groove.

On the other hand, the second bracket has internal teeth concentrically formed around the center of rotation referred to above. When the lock plate slides radially outwardly along the guide groove upon rotation of the cam together with the support shaft, the teeth of the lock plate are brought into engagement with the internal teeth of the second bracket, resulting in locking of the first and second brackets. Reverse rotation of the cam releases the engagement of the teeth of the lock plate with the internal teeth of the second bracket, thus allowing the one of the first and second brackets to rotate relative to the other.

Accordingly, when an operating rod connected to the support shaft is operated, the teeth of the lock plate engage with the internal teeth of the second bracket to retain inclination of the seat back, or the teeth of the lock plate disengage from the internal teeth of the second bracket so that inclination of the seat back can be changed as desired.

In the above-described conventional recliner adjuster, there exist several sliding portions between the lock plate and the opposite side walls of the guide groove, or between the cam and the lock plate, and such sliding portions have respective clearances, though they are slight. Accordingly, when a load is applied to the seat back, the lock plate inclines in a direction of the load, and a strength of engagement of the teeth of the lock plate with the internal teeth of the second bracket becomes weak, thereby making it impossible to obtain a positive locking condition.

To solve this problem, it is conceivable that accuracy in size of the guide groove and the lock plate be enhanced to reduce clearance between the lock plate and the opposite side walls of the guide groove as much as possible. However, this requires considerably accurate metal working with respect to the lock plate and the like, thereby giving rise to another problem of costs increasing.

In view of the above, the applicants of the present invention have hitherto proposed an improved recliner adjuster wherein the lock plate has a projection integrally formed therewith that is, when a load is applied to the seat back under a condition in which teeth of the lock plate are held in engagement with internal teeth of a second bracket, brought into contact with an inner edge of a guide groove to prevent the lock plate within the guide groove from inclining in the direction of the load (see Japanese Laid-Open Patent Publication No. 2000-342370).

According to this recliner adjuster, the load applied to the seat back is transmitted to the teeth of the lock plate via the internal teeth of the second bracket to incline the lock plate within the guide groove, but a force that acts to incline the lock plate is cancelled by contact of the projection with the inner edge of the guide groove, thereby preventing the lock plate from inclining. Accordingly, deterioration in engagement between the teeth of the lock plate and the internal teeth of the second bracket, which may be caused by inclination of the lock plate, is avoided, thereby making it possible to retain the seat back in position.

In the recliner adjuster as disclosed in Japanese Laid-Open Patent Publication No. 2000-342370, however, if a large load that exceeds an allowable load is applied to the seat back, and the lock plate pushes excessively one of the side walls of the guide groove to increase a surface pressure thereof, there is a possibility of the lock plate inclining largely due to deformation of such side wall of the guide groove. Inclination of the lock plate makes engagement between the teeth of the lock plate and the internal teeth of the second bracket weak, thus lowering locking strength.

SUMMARY OF THE INVENTION

The present invention has been developed to overcome the above-described disadvantages.

It is accordingly an objective of the present invention to provide a recliner adjuster capable of enhancing strength of engagement between teeth of a lock plate and internal teeth of a second bracket effectively using a limited space without increasing a number of component parts.

In accomplishing the above and other objectives, the recliner adjuster according to the present invention includes a first bracket fixed to a seat cushion, a second bracket fixed to a seat back so as to confront the first bracket, a cam rotatably mounted between the first and second brackets, and a lock plate interposed between the first and second brackets so as to move radially outwardly or inwardly with rotation of the cam. The lock plate has an engaging portion having teeth formed on an outer edge thereof and also has first and second shoulder portions formed on respective sides of the engaging portion. The first bracket has first and second guide members that define a guide groove therebetween in which the engaging portion of the lock plate is slidably received, while the second bracket has internal teeth that are brought into engagement with the teeth of the engaging portion of the lock plate when the lock plate moves radially outwardly with the engaging portion thereof guided by the guide groove of the first bracket.

When a load applied to the seat back is less than a predetermined value, contact between a side edge of the engaging portion and an end face of one of the first and second guide members withstands the load, and when the load applied to the seat back is greater than the predetermined value, the contact between the side edge of the engaging portion and the end face of the one of the first and second guide members and contact between one of the first and second shoulder portions and a portion of the other of the first and second guide members withstand this load.

This construction enhances strength of engagement between the teeth of the lock plate and the internal teeth of the second bracket, thereby making it possible to withstand a larger load compared with the conventional construction.

Advantageously, each of the first and second shoulder portions of the lock plate has an engaging projection and a recess formed between this engaging portion and the engaging projection, and each of the first and second guide members has an engaging projection to be introduced into the recess of one of the first and second shoulder portions of the lock plate. In this case, when the load applied to the seat back is greater than the predetermined value, the engaging projection of one of the first and second shoulder portions of the lock plate is brought into contact with the engaging projection of one of the first and second guide members.

Again advantageously, each of the first and second guide members has a recess in which the engaging projection of one of the first and second shoulder portions is introduced, and also has a stepped portion defining a portion of the recess. In this case, when a load applied to the seat back is greater than the predetermined value, one of the engaging projections of the first and second shoulder portions and the stepped portion of a corresponding one of the first and second guide members are brought into contact with each other, thereby preventing the engaging portion of the lock plate from sliding radially inwardly.

This construction prevents engagement between the teeth of the lock plate and the internal teeth of the second bracket from releasing, thereby making it possible to maintain a positive locking condition.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, wherein.

DETAILED DESCRIPTION OF THE PREFERRED EMBODIMENTS

Figure 1:
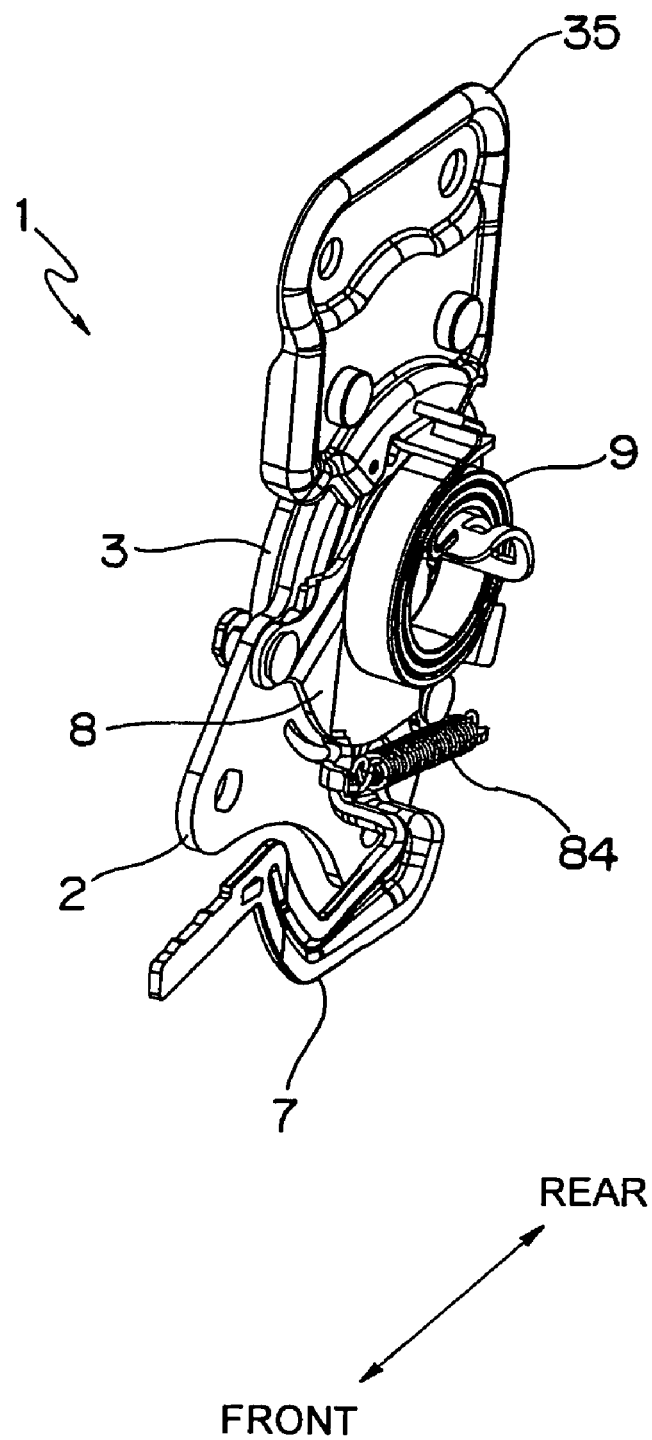
FIG. 1 is a perspective view of a recliner adjuster according to the present invention.
Figure 2:
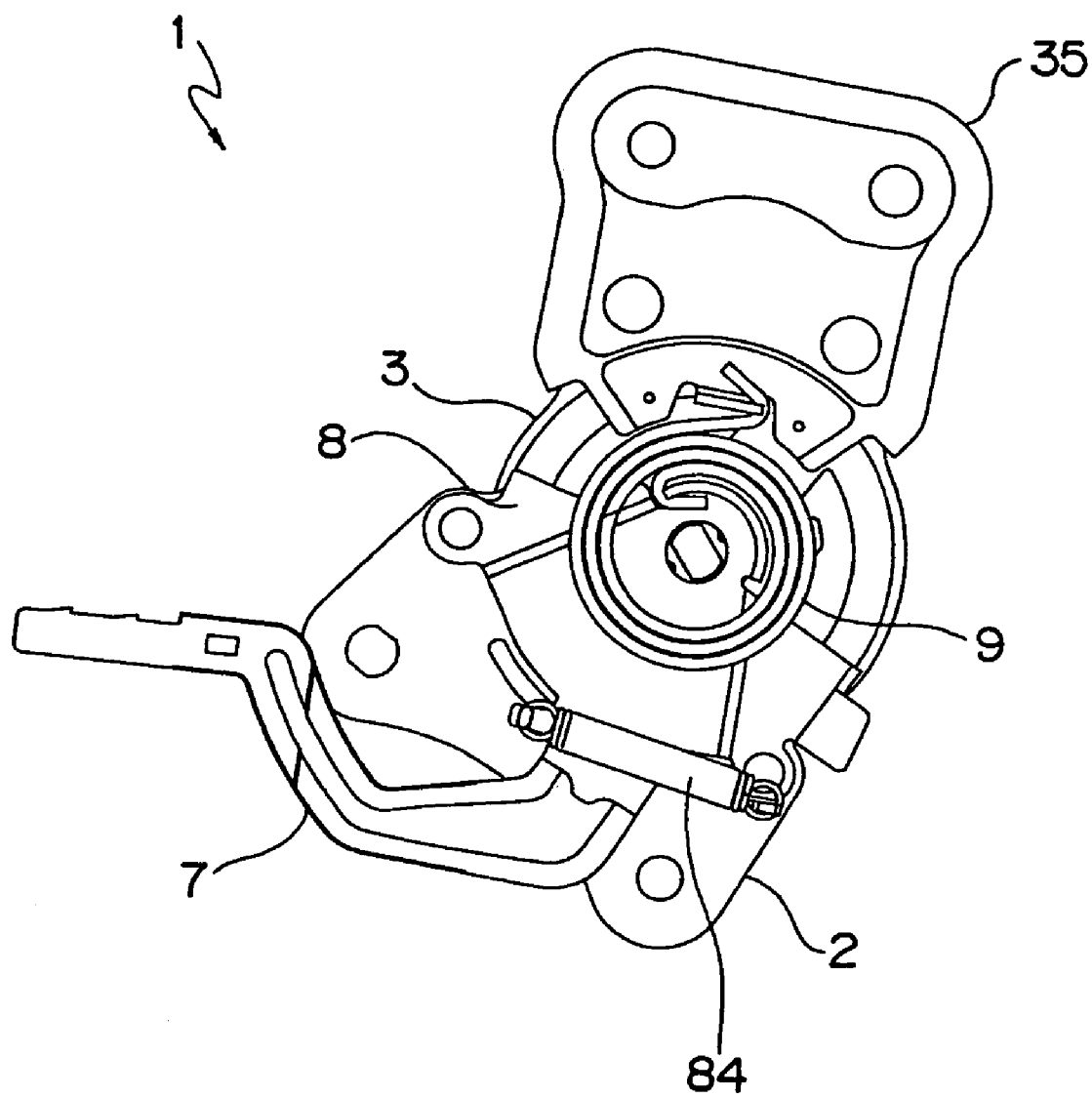
FIG. 2 is a front view of the recliner adjuster of FIG. 1.
Figure 3:
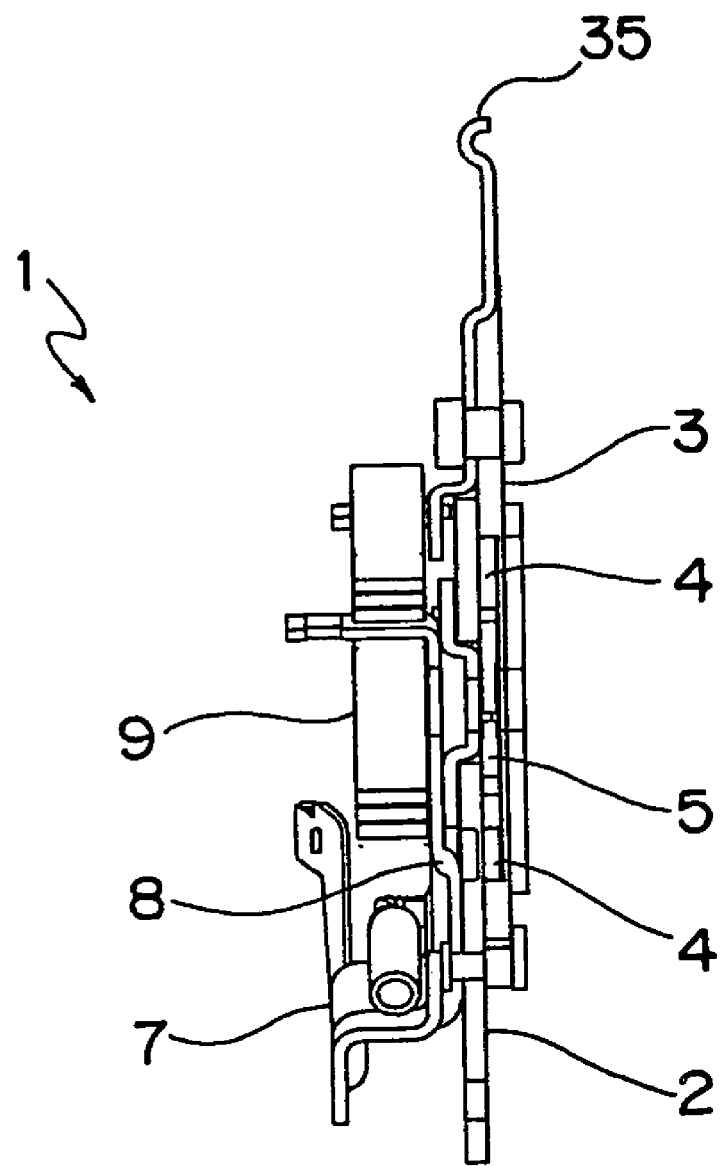
FIG. 3 is a side view of the recliner adjuster of FIG. 1.

This application is based on application Nos. 2002-377161 and 2003-407631 respectively filed Dec. 26, 2002 and Dec. 5, 2003 in Japan, the contents of which are herein expressly incorporated by reference in their entirety.

Referring now to the drawings, there is shown in FIGS. 1 to 4 a recliner adjuster 1 according to the present invention, which is mounted on, for example, an automobile seat on respective sides thereof to retain a seat back at a desired angle with respect to a seat cushion while allowing the seat back to incline.

The recliner adjuster 1 includes a first bracket 2 fixed to the seat cushion (not shown), a second bracket 3 fixed to the seat back (not shown) so as to confront the first bracket 2, a pair of lock plates 4 interposed between the first and second brackets 2, 3, a cam 5 interposed between the first and second brackets 2, 3 to slide the lock plates 4 radially outwardly or inwardly, an operating lever 7 for rotating the cam 5, and a retaining plate 8 for retaining the operating lever 7 such that the operating lever 7 can rotate about a center of rotation of the cam 5.

The first bracket 2 has a generally round upper portion having a central hole 21 define therein in which an engaging portion 7a of the operating lever 7, that is formed by press working to engage with the cam 5, is received. The first bracket 2 also has a pair of (front and rear) guide members 22 protruding inwardly toward the second bracket 3. The front and rear guide members 22 are formed symmetrically with respect to the central hole 21 by press working and have an arcuate shape with the central hole 21 as their center.

Embodiment 1

Figure 4:
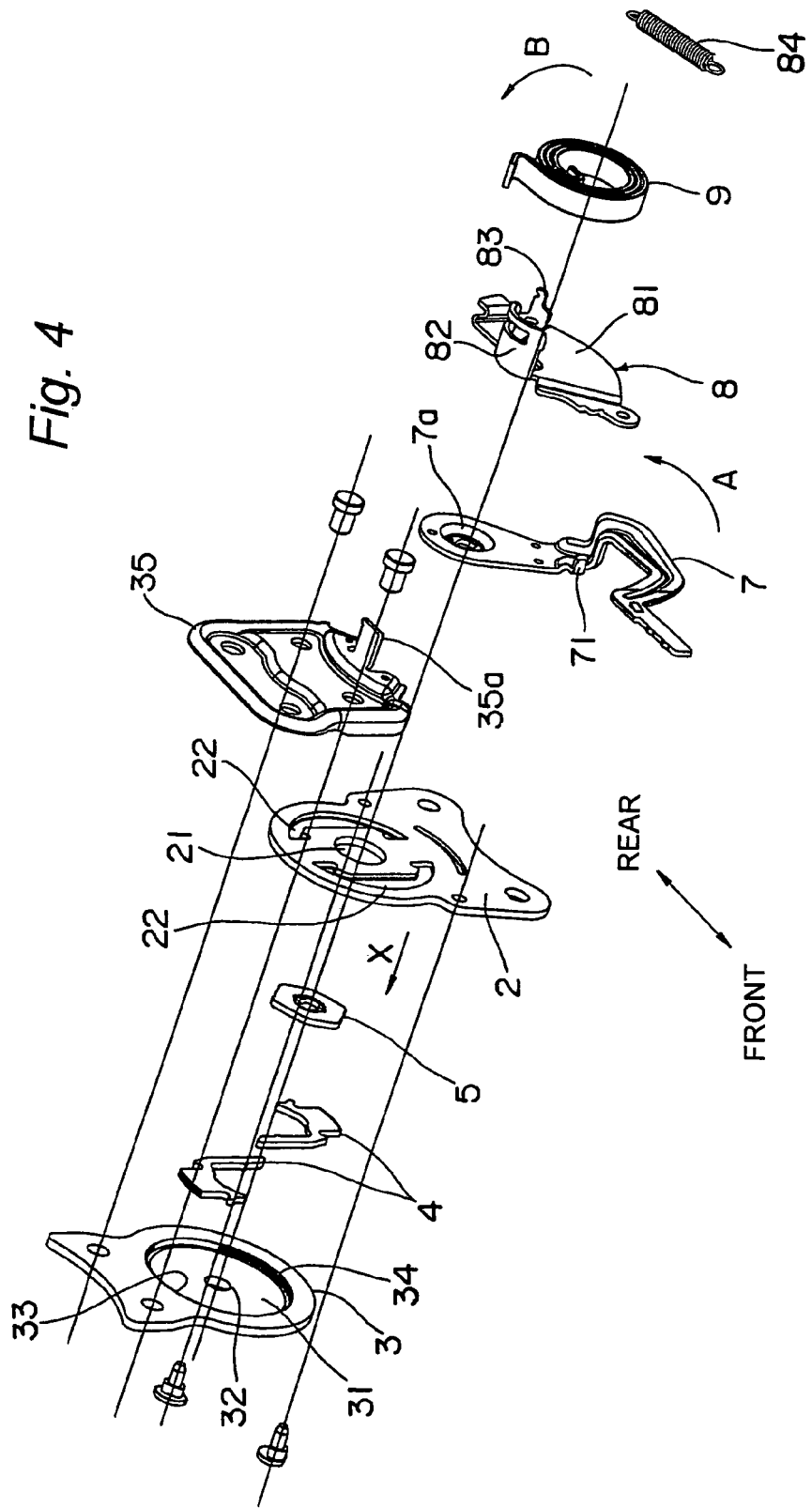
FIG. 4 is an exploded perspective view of the recliner adjuster of FIG. 1.
Figure 5:
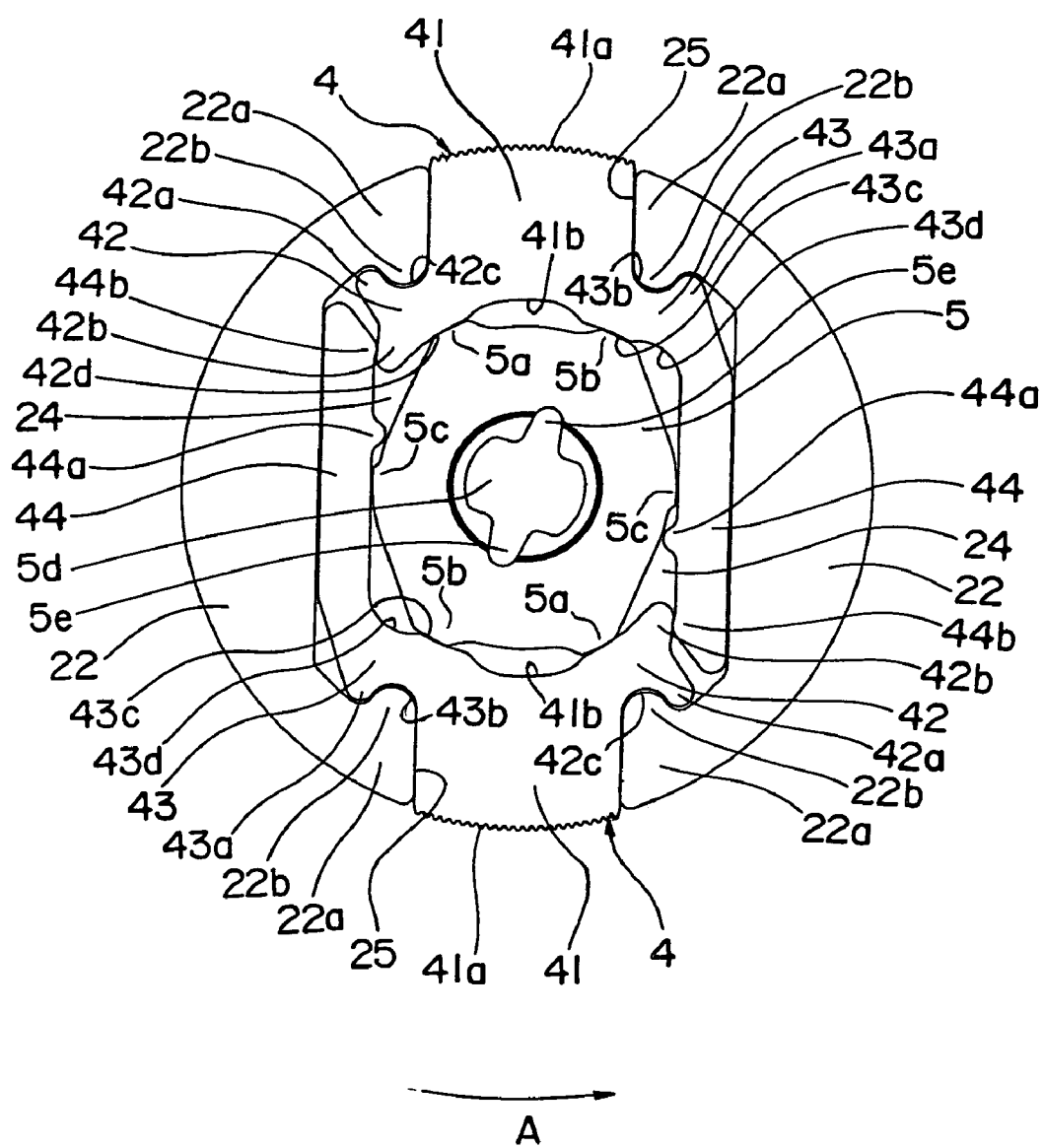
FIG. 5 is a view obtained by superposing guide members of a first bracket on a view of a lock plate and a cam as viewed from a direction of arrow X in FIG. 4, particularly depicting a first embodiment of the present invention.

FIG. 5 is a view obtained by superposing the guide members 22 of the first bracket 2 on a view of lock plate 4 and the cam 5 as viewed from a direction of arrow X in FIG. 4, particularly depicting a first embodiment of the present invention.

As shown in FIG. 5, a space 24 for accommodating the lock plates 4 and the cam 5 therein is defined between the pair of guide members 22. Each of the guide members 22 has two guide portions 22a formed at upper and lower ends thereof, respectively. Mutually confronting guide portions 22a of the pair of guide members 22 define a guide groove 25 therebetween in which a portion (an engaging portion 41 described later) of one of the lock plates 4 is slidably received. Each guide portion 22a has an engaging projection 22b formed radially inwardly thereof to engage with a portion of one of the lock plates 4 as explained later.

As shown in FIG. 4, the second bracket 3 has a generally round lower portion and an upper mounting portion. The second bracket 3 also has a round projection 31 formed in the generally round lower portion by press working so as to protrude outwardly in a direction away from the first bracket 2. The round projection 31 has a central hole 32 defined at a center thereof in alignment with the central hole 21 of the first bracket 2.

The round projection 31 has a round recess 33 defined on a side thereof (right-hand side in FIG. 4) confronting the first bracket 2. The round recess 33 has an internal diameter slightly greater than a radius of curvature of an outer periphery of the guide members 22. When the first and second brackets 2, 3 are mated with each other, the guide members 22 are received in the round recess 33 with a clearance defined between the outer periphery of the guide members 22 and a ring-shaped side wall of the round recess 33. The ring-shaped side wall of the round recess 33 has internal teeth 34 formed at upper and lower portions thereof so as to confront each other.

The second bracket 3 has front and rear mounting holes defined therein adjacent an upper edge thereof, and a third bracket 35 employed as a retainer plate for retaining the first bracket 2 on the second bracket 3 is bolted to the mounting holes in the second bracket 3. The third bracket 35 is fixed to the seat back. Under a condition in which the first bracket 2 is mated with the second bracket 3, when the third bracket 35 is fixed to the second bracket 3, the third bracket 35 acts to hold an upper portion of the first bracket 2 while allowing rotation of the first bracket 2. By so doing, separation of the upper portion of the first bracket 2 from the second bracket 3 is avoided.

Furthermore, the first bracket 2 has front and rear mounting holes defined therein adjacent a lower edge thereof, and the first bracket 2 is bolted to the seat cushion via these mounting holes.

As shown in FIG. 5, each lock plate 4 has an engaging portion 41 vertically slidably received in one of the guide grooves 25 in the first bracket 2, first and second shoulder portions 42, 43 integrally formed with the engaging portion 41 on respective sides thereof, and a leg portion 44 integrally formed with the second shoulder portion 43 so as to extend therefrom toward first shoulder portion 42 of another lock plate 4. The engaging portion 41 has teeth 41a formed on an outer edge thereof for engagement with the internal teeth 34 of the second bracket 3. Under a condition in which the guide members 22 are received in the round recess 33 in the second bracket 3, rotation of one of the first and second brackets 2, 3 relative to the other is prevented by engagement of the teeth 41a of the engaging portion 41 with the internal teeth 34 of the second bracket 3. The leg portion 44 has a straight outer edge held in sliding contact with a straight inner edge of one of the guide members 22, and a generally straight inner edge held in sliding contact with an outer periphery of the cam 5 accommodated in a space encircled by the pair of lock plates 4.

A length of the leg portion 44 is determined such that each lock plate 4 accommodated in the space 24 defined between the first and second brackets 2, 3 can move between an engaging position, where upon radially outward movement of the lock plate 4 the engaging portion 41 is held in engagement with the internal teeth 34 of the second bracket 3, and an engagement release position where upon radially inward movement of the lock plate 4 the engagement of the engaging portion 41 with the internal teeth 34 of the second bracket 3 is released. More specifically, a distance between the engaging position and the engagement release position is so set as to be slightly greater than a tooth depth of the teeth 41a. Thus, when the lock plate 4 moves radially outwardly, the teeth 41a of the engaging portion 41 are brought into engagement with the internal teeth 34 of the second bracket 3, and when the lock plate 4 moves radially inwardly toward the central hole 21, the engagement of the teeth 41a of the engaging portion 41 with the internal teeth 34 of the second bracket 3 is released.

The first shoulder portion 42 of each lock plate 4 has a first engaging projection 42a formed at a radially outward portion thereof that is brought into contact with the engaging projection 22b of the guide member 22 opposed thereto, and also has a second engaging projection 42b formed at a radially inward portion thereof that is brought into contact with an inner edge of a distal end of the leg portion 44 of another lock plate 4. A recess 42c, into which the engaging projection 22b of the guide member 22 is introduced, is formed between the engaging portion 41 and the first engaging projection 42a. The recess 42c has a shape complementary to the shape of the engaging projection 22b of the guide member 22. The second shoulder portion 43 of each lock plate 4 has a first engaging projection 43a formed at a radially outward portion thereof that is brought into contact with the engaging projection 22b of the guide member 22 opposed thereto. A first recess 43b, into which the engaging projection 22b of the guide member 22 is introduced, is formed between the engaging portion 41 and the first engaging projection 43a. The first recess 43b has a shape complementary to the shape of the engaging projection 22b of the guide member 22. The leg portion 44 has a first engaging projection 44a integrally formed therewith on an inner edge thereof that is brought into contact with the cam 5, and also has a second engaging projection 44b integrally formed therewith on an inner edge of a distal end thereof that is brought into contact with the second engaging projection 42b of the first shoulder portion 42 of another lock plate 4.

The cam 5 is generally hexagonal and has three corners confronting one of the lock plates 4 and three other corners confronting the other of the lock plates 4. The three corners confronting one of the lock plates 4 act as a first projection 5a that is brought into contact with an inclined inner surface 42d of the first shoulder portion 42, a second projection 5b that is brought into contact with a second engaging projection 43c formed on an inner surface of the second shoulder portion 43, and a third projection 5c that is brought into contact with the first engaging projection 44a of the leg portion 44. The three other corners confronting the other of the lock plates 4 similarly act as a first projection 5a that is brought into contact with an inclined inner surface 42d of the first shoulder portion 42 of such lock plate 4, a second projection 5b that is brought into contact with a second engaging projection 43c formed on an inner surface of the second shoulder portion 43, and a third projection 5c that is brought into contact with the first engaging projection 44a of the leg portion 44.

The cam 5 has an elongated opening 5d defined therein at a center thereof and two cut-outs 5e formed on opposite sides of a minor axis of the elongated opening 5d. The operating lever 7 has two pins (not shown) integrally formed therewith on a surface (convex surface on the left-hand side in FIG. 4) of the engaging portion 7a. The cam 5 is connected to the operating lever 7 by introducing the engaging portion 7a of the operating lever 7 into the central hole 21 of the first bracket 2 and introducing the two pins into the cut-outs 5e of the cam 5, respectively.

The retaining plate 8 for retaining the operating lever 7 is mounted on the first bracket 2 to ensure that the operating lever 7 can be smoothly operated on the first bracket 2. As shown in FIG. 4, the retaining plate 8 has a plate body 81 for holding the operating lever 7, an arcuate plate 82 integrally formed with the plate body 81 on an upper edge thereof so as to extend outwardly therefrom, and a spring latch 83 integrally formed with the plate body 81 at a rear end of a lower edge thereof so as to extend outwardly therefrom.

The operating lever 7 also has a spring latch 71 integrally formed therewith at an intermediate portion thereof so as to extend outwardly therefrom. A coil spring 84 is tensioned between the spring latch 71 of the operating lever 7 and the spring latch 83 of the retaining plate 8 to bias the operating lever 7 in the direction of arrow A.

The third bracket 35 has a spring latch 35a integrally formed therewith so as to extend outwardly (rightward in FIG. 4) therefrom. A spiral spring 9 is hooked at one end thereof to the spring latch 35a of the third bracket 35 and at another end thereof to a front edge of the arcuate plate 82 of the retaining plate 8. The spiral spring 9 acts to bias the second bracket 3 in the direction of arrow B via the third bracket 35, thereby biasing the seat back frontward via the second bracket 3.

The recliner adjuster of the above-described construction operates as follows.

In a normal condition in which the operating lever 7 is not operated, the operating lever 7 is biased in the direction of arrow A by a biasing force of the coil spring 84 and, hence, the cam 5 connected to the operating lever 7 is similarly biased in the direction of arrow A.

In this condition, as shown in FIG. 5, the first and second projections 5a, 5b of the cam 5 are held in contact with the inclined inner surface 42d and the second engaging projection 43c of each lock plate 4, respectively, and the second engaging projection 42b of the first shoulder portion 42 of the lock plate 4 is held in contact with the second engaging projection 44b of the leg portion 44 of another lock plate 4. Accordingly, each lock plate 4 is biased radially outwardly while being held in a predetermined posture. At this moment, the teeth 41a of the lock plate 4 protrude radially outwardly from the guide groove 25 and are held in engagement with the internal teeth 34 of the second bracket 3 and, hence, a position of the second bracket 3 relative to the first bracket 2 or an inclination of the seat back relative to the seat cushion is held at a predetermined position or a predetermined angle.

In this condition, when a grip of the operating lever 7 is lifted against the biasing force of the coil spring 84, the cam 5 rotates in the direction counter to arrow A. As a result, the first projection 5a of the cam 5 is introduced into a first recess 41b formed between the inclined inner surface 42d and the second engaging projection 43c of the lock plate 4, while the second projection 5b of the cam 5 is introduced into a second recess 43d formed on the inner side of the second shoulder portion 43 of the lock plate 4. Furthermore, the third projection 5c of the cam 5 is brought into contact with and pushes the first engaging projection 44a of the leg portion 44 of the lock plate 4. Thus, the engaging portion 41 of the lock plate 4 slides radially inwardly along the guide groove 25, the engagement of the teeth 41a with the internal teeth 34 of the second bracket 3 is released, and the lock plate 4 moves from the engaging position to the engagement release position. Accordingly, a posture (inclination) of the seat back relative to the seat cushion can be changed as desired.

After a posture of the seat back relative to the seat cushion has been determined, when a person's hand is released from the grip of the operating lever 7, the biasing force of the coil spring 84 rotates the cam 5 in the direction of arrow A, which in turn slides the lock plate 4 radially outwardly, thereby engaging the teeth 41a of the lock plate 4 with the internal teeth 34 of the second bracket 3 and holding the seat back in a newly set posture.

Under a condition in which the teeth 41a of the lock plate 4 are held in engagement with the internal teeth 34 of the second bracket 3, when a frontward load, less than a predetermined value, is applied to the seat back, a side edge of the engaging portion 41 of the lock plate 4 on the side of the first shoulder portion 42 is pressed against a side edge of the guide groove 25 (end surface of the guide portion 22a of the guide member 22) and surface pressures of both of these increase to withstand the load, thereby restraining the lock plate 4 from inclining. When a frontward load greater than the predetermined value is applied to the seat back, and the lock plate 4 begins to incline due to deformation of the guide member 22 or the lock plate 4, not only is the side edge of the engaging portion 41 of the lock plate 4 on the side of the first shoulder portion 42 pressed against the side edge of the guide groove 25 (end surface of the guide portion 22a of the guide member 22), but also the first engaging projection 43a integral with the second shoulder portion 43 of the lock plate 4 is pressed against the engaging projection 22b integral with the guide portion 22a of the guide member 22. As a result, surface pressures of these mating portions increase to withstand this load, thereby restraining the lock plate 4 from inclining.

On the other hand, under a condition in which the teeth 41a of the lock plate 4 are held in engagement with the internal teeth 34 of the second bracket 3, when a rearward load, less than a predetermined value, is applied to the seat back, a side edge of the engaging portion 41 of the lock plate 4 on the side of the second shoulder portion 43 is pressed against a side edge of the guide groove 25 (end surface of the guide portion 22a of the guide member 22) and surface pressures of both of these increase to withstand the load, thereby restraining the lock plate 4 from inclining. When a rearward load greater than the predetermined value is applied to the seat back, and the lock plate 4 begins to incline due to deformation of the guide member 22 or the lock plate 4, not only is the side edge of the engaging portion 41 of the lock plate 4 on the side of the second shoulder portion 43 pressed against the side edge of the guide groove 25 (end surface of the guide portion 22a of the guide member 22), but also the first engaging projection 42a integral with the first shoulder portion 42 of the lock plate 4 is pressed against the engaging projection 22b integral with the guide portion 22a of the guide member 22. As a result, surface pressures of these mating portions increase to withstand this load, thereby restraining the lock plate 4 from inclining.

That is, where a frontward or rearward load applied to the seat back is less than the predetermined value, contact between the engaging portion 41 of the lock plate 4 and the side edge of the guide groove 25 withstands the load, and where a frontward or rearward load applied to the seat back is greater than the predetermined value, contact between the engaging portion 41 of the lock plate 4 and the side edge of the guide groove 25 withstands this load first and, upon subsequent deformation of a portion of the lock plate 4 or the guide member 22, contact between the first or second shoulder portion 42, 43 of the lock plate 4 and the guide portion 22a of the guide member 22 further withstands the load.

Embodiment 2

Figure 6:
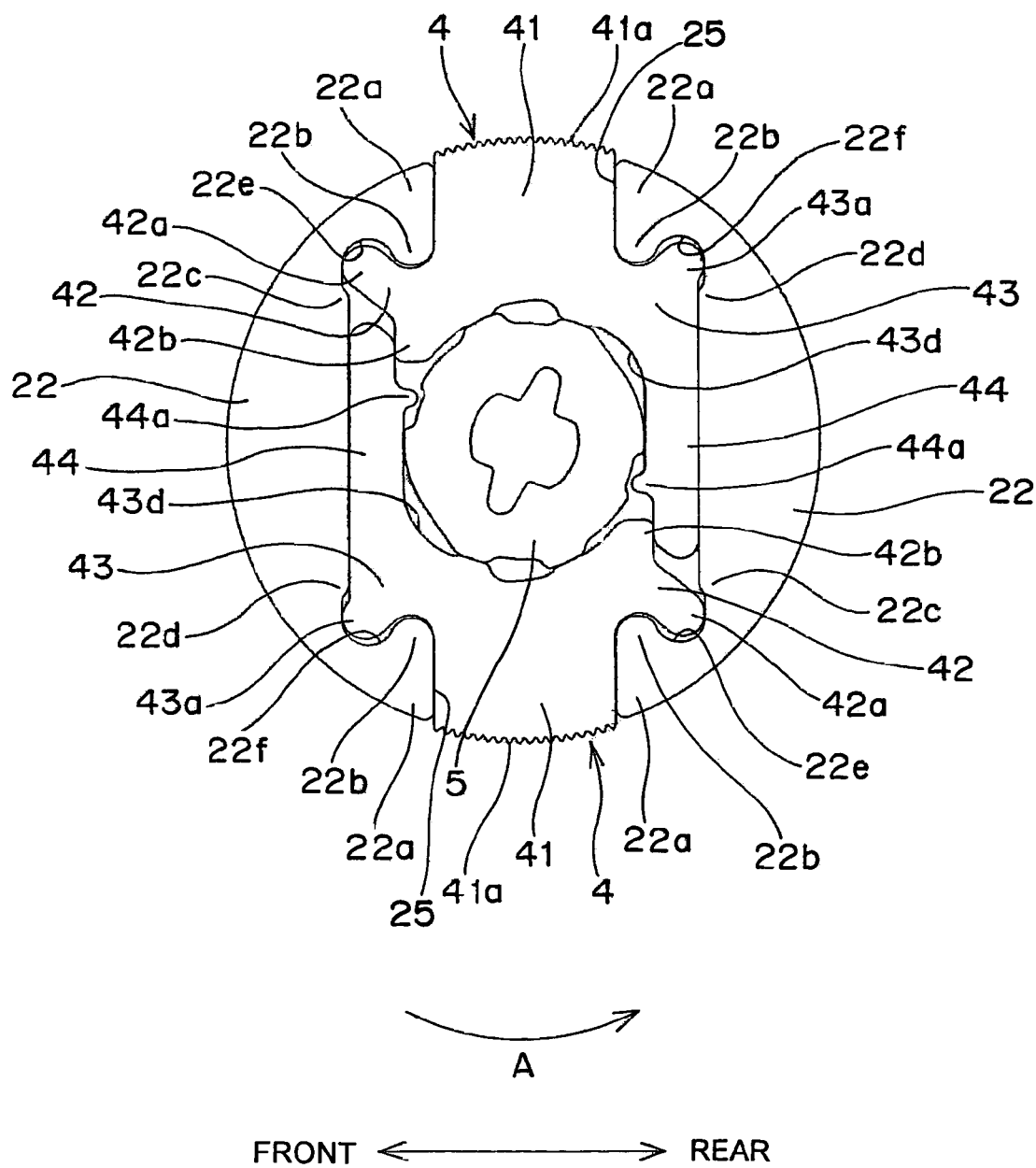
FIG. 6 is a view similar to FIG. 5, but depicting a second embodiment of the present invention.

FIG. 6 depicts a second embodiment of the recliner adjuster according to the present invention, which has substantially the same construction as the first embodiment referred to above, and only differences therebetween are discussed hereinafter.

In the first embodiment the inner edge of each guide member 22 that is held in sliding contact with the leg portion 44 of the lock plate 4 is straight, while in the second embodiment each guide member 22 has a first stepped portion 22c and a second stepped portion 22d formed at opposite ends of an inner edge thereof. A first recess 22e in which first engaging projection 42a of first shoulder portion 42 of lock plate 4 is accommodated is formed between engaging projection 22b and the first stepped portion 22c of the guide member 22, while a second recess 22f, in which first engaging projection 43a of second shoulder portion 43 of another lock plate 4 is accommodated, is formed between another engaging projection 22b and the second stepped portion 22d of the guide member 22.

Both the first engaging projection 42a of the first shoulder portion 42 and the first engaging projection 43a of the second shoulder portion 43 are generally semicircular and protrude slightly outwardly from an extension of the inner edge of the guide member 22 held in sliding contact with the leg portion 44 of the lock plate 4.

Furthermore, in the first embodiment the leg portion 44 of the lock plate 4 has a generally straight inner edge except for the first engaging projection 44a and accordingly has substantially the same width throughout the length thereof, while in the second embodiment a width of the leg portion 44 between the second recess 43d and the first engaging projection 44a is set to be greater than a width of the leg portion 44 between the first engaging projection 44a and a distal end thereof. The distal end of the leg portion 44 has no second engaging projection (44b in the first embodiment). Accordingly, an outer edge of the second engaging projection 42b of the first shoulder portion 42 extends substantially parallel to the inner edge of the guide member 22 and is held in sliding contact with the inner edge of the distal end of the leg portion 44 of the lock plate 4. The length of the leg portion 44 of the lock plate 4 in this embodiment is set to be shorter than that of the leg portion 44 of the lock plate 4 in the first embodiment.

In the second embodiment, the first and second stepped portions 22c, 22d of each guide member 22, and the first and second recesses 22e, 22f, are so configured that in the engagement release position where engagement between the engaging portions 41 of the pair of lock plates 4 and the internal teeth 34 of the second bracket 3 is released, the first engaging projection 42a of the first shoulder portion 42 of one of the lock plates 4 and the first engaging projection 43a of the second shoulder portion 43 of the other of the lock plates 4 are brought into contact with the first stepped portion 22c and the second stepped portion 22d, respectively. By so doing, each lock plate 4 is prevented from further sliding radially inwardly from the engagement release position.

The second embodiment of the recliner adjuster of the above-described construction operates in the same manner as the first embodiment of the recliner adjuster in a normal condition in which the operating lever 7 is not operated or when a posture of the seat back with respect to the seat cushion is being changed. The second embodiment differs in operation from the first embodiment when a load greater than a predetermined value is applied to the seat back under a condition in which teeth 41a of the lock plate 4 are held in engagement with internal teeth 34 of second bracket 3. An operation peculiar to the second embodiment is explained hereinafter with reference to FIGS. 6 and 7.

Under a condition in which the teeth 41a of the lock plate 4 are held in engagement with the internal teeth 34 of the second bracket 3, when a frontward load less than a predetermined value is applied to the seat back, a side edge of the engaging portion 41 of the lock plate 4 on the side of the first shoulder portion 42 is pressed against a side edge of the guide groove 25 and surface pressures of these portions increase to withstand the load, thereby restraining the lock plate 4 from inclining. When a frontward load greater than the predetermined value is applied to the seat back, and the lock plate 4 begins to incline due to deformation of the guide member 22 or the lock plate 4, not only is the side edge of the engaging portion 41 of the lock plate 4 on the side of the first shoulder portion 42 pressed against the side edge of the guide groove 25, but also the first engaging projection 43a integral with the second shoulder portion 43 of the lock plate 4 is pressed against the engaging projection 22b integral with the guide portion 22a of the guide member 22. As a result, surface pressures of these mating portions increase and the first engaging projection 42a integral with the first shoulder portion 42 of the lock plate 4 is pressed against the first stepped portion 22c of the guide member 22, thereby making it possible to withstand this large load.

When the first engaging projection 42a of the lock plate 4 is pressed against the first stepped portion 22c of the guide member 22 with the lock plate 4 inclined, the engaging portion 41 of the lock plate 4 is prevented from further sliding radially inwardly along the guide groove 25 and, hence, the engagement between the teeth 41a of the lock plate 4 and the internal teeth 34 of the second bracket 3 is not released, thereby making it possible to maintain a positive locking condition.

Figure 7:
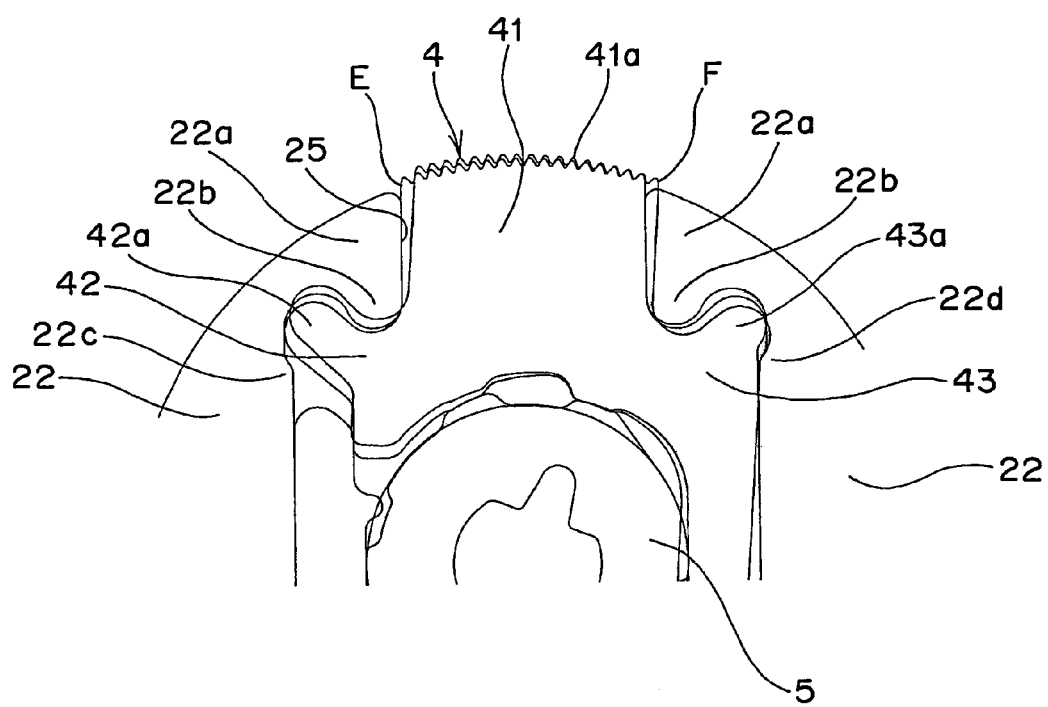
FIG. 7 is an enlarged partial view of FIG. 6, particularly depicting a condition where one of the guide members is deformed upon application of a large load to a seat back.

On the other hand, under a condition in which the teeth 41a of the lock plate 4 are held in engagement with the internal teeth 34 of the second bracket 3, when a rearward load less than a predetermined value is applied to the seat back, a side edge of the engaging portion 41 of the lock plate 4 on the side of the second shoulder portion 43 is pressed against a side edge of the guide groove 25 and surface pressures of these portions increase to withstand the load, thereby restraining the lock plate 4 from inclining (see line E in FIG. 7). When a rearward load greater than the predetermined value is applied to the seat back, and the lock plate 4 begins to incline due to deformation of the guide member 22 or the lock plate 4, not only is the side edge of the engaging portion 41 of the lock plate 4 on the side of the second shoulder portion 43 pressed against the side edge of the guide groove 25, but also the first engaging projection 42a integral with the first shoulder portion 42 of the lock plate 4 is pressed against the engaging projection 22b integral with the guide portion 22a of the guide member 22. As a result, surface pressures of these mating portions increase and the first engaging projection 43a integral with the second shoulder portion 43 of the lock plate 4 is pressed against the second stepped portion 22d of the guide member 22, thereby making it possible to withstand this large load (see line F in FIG. 7).

When the first engaging projection 43a of the lock plate 4 is pressed against the second stepped portion 22d of the guide member 22 with the lock plate 4 inclined, the engaging portion 41 of the lock plate 4 is prevented from further sliding radially inwardly along the guide groove 25 and, hence, the engagement between the teeth 41a of the lock plate 4 and the internal teeth 34 of the second bracket 3 is not released, thereby making it possible to maintain a positive locking condition.

That is, where a frontward or rearward load applied to the seat back is less than the predetermined value, contact between the engaging portion 41 of the lock plate 4 and the side edge of the guide groove 25 withstands the load, and where a frontward or rearward load applied to the seat back is greater than the predetermined value, contact between the engaging portion 41 of the lock plate 4 and the side edge of the guide groove 25 withstands the load first and, upon subsequent deformation of a portion of the lock plate 4 or the guide member 22, contact between the first or second shoulder portion 42, 43 of the lock plate 4 and the guide portion 22a of the guide member 22 further withstands the load. In addition, because the first engaging projection 42a of the first shoulder portion 42 of the lock plate 4, or the first engaging projection 43a of the second shoulder portion 43 of the lock plate 4, is pressed against the first stepped portion 22c of the guide member 22 or the second stepped portion 22d of another guide member 22, the engaging portion 41 of the lock plate 4 is prevented from further sliding radially inwardly, thereby making it possible to ensure the engagement between the teeth 41a of the lock plate 4 and the internal teeth 34 of the second bracket 3 and to maintain a positive locking condition.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recliner adjuster for adjusting inclination of a seat back relative to a seat cushion, comprising:
   a first bracket to be fixed to the seat cushion, said first bracket having first and second guide members that define a guide groove therebetween;
   a second bracket to be fixed to the seat back so as to confront said first bracket when fixed to the seat cushion, said second bracket having internal teeth;
   a cam rotatably mounted between said first and second brackets when said first bracket is fixed to the seat cushion and said second bracket is fixed to the seat back; and
   a lock plate interposed between said first and second brackets, when said first bracket is fixed to the seat cushion and said second bracket is fixed to the seat back, so as to be movable radially outwardly or radially inwardly with rotation of said cam, said lock plate having
      (i) an engaging portion that has teeth on an outer edge thereof, and
      (ii) first and second shoulder portions on respective sides of said engaging portion,
   such that when said first bracket is fixed to the seat cushion and said second bracket is fixed to the seat back
      (i) said engaging portion is slidably received within said guide groove such that upon radially outward movement of said engaging portion, while being guided by said guide groove, said internal teeth are brought into engagement with said teeth on the outer edge of said engaging portion,
      (ii) when a first load applied to the seat back is less than a predetermined value, a first contact force is generated between a side edge of said engaging portion and an end face of one of said first and second guide members, which first contact force withstands the first load, and
      (iii) when a second load applied to the seat back is greater than the predetermined value, a second contact force is generated between said side edge of said engaging portion and said end face of said one of said first and second guide members, and a third contact force is generated between a portion of the other of said first and second guide members and one of said first and second shoulder portions along a surface that forms an acute angle with a direction of the second contact force, with the acute angle opening in the direction of the second contact force, which second and third contact forces withstand the second load,
   wherein
      (i) each of said first and second shoulder portions has a first engaging projection and a first recess between said first engaging projection and said engaging portion, and
      (ii) each of said first and second guide members has a second engaging projection that is receivable within a corresponding said first recess,
   such that when the second load is applied to the seat back, with said second engaging projection of said other of said first and second guide members within said first recess of said one of said first and second shoulder portions, the third contact force is generated by bringing said first engagement projection of said one of said first and second shoulder portions into contact with said second engaging projection of said other of said first and second guide members, and
   wherein
      (iii) said each of said first and second guide members has a second recess into which a corresponding one of said first and second shoulder portions is receivable, and also has a stepped portion defining a part of said second recess,
   such that when the second load is applied to the seat back, said first engagement projection of one of said first and second shoulder portions comes into contact with said stepped portion defining said part of said second recess of a corresponding one of said first and second guide members, so as to prevent said engaging portion from sliding radially inwardly.

2. The recliner adjuster according to claim 1, wherein when the second load is applied to the seat back, said first engagement projection of the other of said first and second shoulder portions comes into contact with said stepped portion defining said part of said second recess of said one of said first and second guide members.

3. A recliner adjuster for adjusting inclination of a seat back relative to a seat cushion, comprising:
   a first bracket to be fixed to the seat cushion, said first bracket having first and second guide members that define a guide groove therebetween, each of said first and second guide members having a first engaging projection;
   a second bracket to be fixed to the seat back so as to confront said first bracket when fixed to the seat cushion, said second bracket having internal teeth;
   a cam rotatably mounted between said first and second brackets when said first bracket is fixed to the seat cushion and said second bracket is fixed to the seat back; and
   a lock plate interposed between said first and second brackets, when said first bracket is fixed to the seat cushion and said second bracket is fixed to the seat back, so as to be movable radially outwardly or radially inwardly with rotation of said cam, said lock plate having
      (i) an engaging portion that has teeth on an outer edge thereof, and
      (ii) first and second shoulder portions on respective sides of said engaging portion, each of said first and second shoulder portions having a second engaging projection and a first recess between said second engaging projection and said engaging portion,
   wherein said first engaging projection is receivable within a corresponding said first recess and complementarily shaped relative thereto, such that when said first bracket is fixed to the seat cushion and said second bracket is fixed to the seat back
      (i) said engaging portion is slidably received within said guide groove such that upon radially outward movement of said engaging portion, while being guided by said guide groove, said internal teeth are brought into engagement with said teeth on the outer edge of said engaging portion,
      (ii) when a first load applied to the seat back is less than a predetermined value, a first contact force is generated between a side edge of said engaging portion and an end face of one of said first and second guide members, which first contact force withstands the first load, and (iii) when a second load applied to the seat back is greater than the predetermined value, a second contact force is generated between said side edge of said engaging portion and said end face of said one of said first and second guide members, and a second third contact force is generated by bringing said second engagement projection of one of the said first and second shoulder portions into contact with said first engaging projection of the other of said first and second guide members, while said first engaging projection of the other of said first and second guide members is within said first recess of said one of said first and second shoulder portions, which second and third contact forces withstand the second load, and wherein (i) said each of said first and second guide members has a second recess into which a corresponding one of said first and second shoulder portions is receivable, and also has a stepped portion defining a part of said second recess, such that when the second load is applied to the seat back, said second engagement projection of one of said first and second shoulder portions comes into contact with said stepped portion defining said part of said second recess of a corresponding one of said first and second guide members, so as to prevent said engaging portion from sliding radially inwardly.

4. The recliner adjuster according to claim 3, wherein when the second load is applied to the seat back, said second engagement projection of the other of said first and second shoulder portions comes into contact with said stepped portion defining said part of said second recess of said one of said first and second guide members.

\* \* \* \* \*